United States Patent
Dsouza et al.

(10) Patent No.: US 11,864,020 B2
(45) Date of Patent: *Jan. 2, 2024

(54) UPLINK BANDWIDTH ESTIMATION OVER BROADBAND CELLULAR NETWORKS

(71) Applicant: Cisco Technology, Inc., San Jose, CA (US)

(72) Inventors: Keith Neil Mark Dsouza, Pacifica, CA (US); Shivaji Pundlik Diwane, Pleasanton, CA (US); Madhusudana Rao Kata, Pleasanton, CA (US); Sendilvadivu Ganesan, Milpitas, CA (US); Divya Sudhakaran Pillai, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/014,647

(22) Filed: Sep. 8, 2020

(65) Prior Publication Data

US 2020/0404535 A1 Dec. 24, 2020

Related U.S. Application Data

(63) Continuation of application No. 16/123,830, filed on Sep. 6, 2018, now Pat. No. 10,779,188.

(51) Int. Cl.
*H04L 12/00* (2006.01)
*H04W 28/02* (2009.01)
(Continued)

(52) U.S. Cl.
CPC ..... *H04W 28/0278* (2013.01); *H04L 43/0888* (2013.01); *H04L 43/0894* (2013.01);
(Continued)

(58) Field of Classification Search
None
See application file for complete search history.

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| EP | 2826165 B1 | 7/2017 |
| WO | WO 2013/020126 | 2/2013 |

(Continued)

OTHER PUBLICATIONS

International Search Report and Written Opinion from the International Searching Authority, dated Nov. 6, 2019, 14 pages, for corresponding International Patent Application No. PCT/US2019/048827.

(Continued)

*Primary Examiner* — Sai Aung
*Assistant Examiner* — Lionel Preval
(74) *Attorney, Agent, or Firm* — Polsinelli (57) ABSTRACT

Disclosed are methods, systems and non-transitory computer readable mediums for estimating bandwidth over packet data networks, for example, 5G networks. The methods, systems and non-transitory computer readable mediums can include modifying a buffer status report (e.g., via application programming interface) and reporting, to an eNodeB, the modified buffer status report. The methods, systems and non-transitory computer readable mediums can also include calculating the required throughput to satisfying transmitting a data amount stored at a regular buffer, receiving, from the eNodeB, uplink grants and transmitting, data from the regular buffer. The methods, systems and non-transitory computer readable mediums can also include (Continued)

calculating estimated throughput from the user equipment, determining if the estimated throughput services the data amount stored at the regular buffer and in response to the estimated throughput being insufficient to service the data amount stored the regular buffer, determining if a counter is less than a threshold value.

17 Claims, 5 Drawing Sheets

(51) Int. Cl.
    *H04L 43/0888*    (2022.01)
    *H04L 43/0894*    (2022.01)
    *H04W 28/18*      (2009.01)
    *H04W 72/21*      (2023.01)
    *H04W 84/04*      (2009.01)

(52) U.S. Cl.
    CPC ........... *H04W 28/18* (2013.01); *H04W 72/21* (2023.01); *H04W 84/045* (2013.01)

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2011/0296064 A1* | 12/2011 | Ehsan ................... H04L 47/30 710/57 |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |

(56) References Cited

U.S. PATENT DOCUMENTS

| | | |
|---|---|---|
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332333 A1 | 11/2017 | Santhanam et al. |
| 2017/0332421 A1 | 11/2017 | Sternberg et al. |
| 2017/0339706 A1 | 11/2017 | Andreoli-Fang et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0124764 A1 | 5/2018 | Lee |
| 2018/0131490 A1 | 5/2018 | Patel et al. |
| 2018/0199343 A1* | 7/2018 | Deogun ............... H04L 5/0044 |
| 2018/0270700 A1* | 9/2018 | Babaei ............... H04W 72/042 |
| 2018/0302868 A1 | 10/2018 | Bhorkar et al. |
| 2018/0317123 A1* | 11/2018 | Chen ............... H04W 72/0413 |
| 2021/0306903 A1* | 9/2021 | Wang ............... H04W 74/0833 |

FOREIGN PATENT DOCUMENTS

| | | |
|---|---|---|
| WO | WO 2014/098556 | 6/2014 |
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Shwetha et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

* cited by examiner

UPLINK BANDWIDTH ESTIMATION OVER BROADBAND CELLULAR NETWORKS

CROSS-REFERENCE TO RELATED APPLICATION

This application is a continuation of U.S. patent application Ser. No. 16/123,830 filed on Sep. 6, 2018, the contents of which is incorporated by reference in its entirety.

TECHNICAL FIELD

The present technology pertains to packet data networks, and more specifically to estimating uplink bandwidth for user equipment over 5G networks.

BACKGROUND

Fifth generation (5G) mobile and wireless networks will provide enhanced mobile broadband communications and are intended to deliver a wider range of services and applications as compared to prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks extend the network slicing concept utilized in previous generation architectures.

Within the scope of the 5G mobile and wireless network architecture, resources are shared between a number of subscribers (e.g., UE). As a results, overall bandwidth available to subscribers is shared based on one or more parameters (e.g., channel conditions, network congestion, signal to noise ratio, resource availability at the evolved node B (eNodeB)). As a result, even though the theoretical maximum throughput that the UE can support is known, it is difficult to estimate or predict the amount of throughput any specific UE can actually achieve over the network. As a result, upper layer protocols (e.g., TCP/IP, UDP, etc.) cannot make accurate decisions for traffic over cellular interfaces (e.g., modem).

BRIEF DESCRIPTION OF THE DRAWINGS

In order to describe the manner in which the above recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are methods, systems and non-transitory computer readable mediums for estimating bandwidth over packet data networks, for example, 5G networks. The methods, systems and non-transitory computer readable mediums can include modifying a buffer status report (e.g., via application programming interface) and reporting, to an eNodeB, the modified buffer status report. The methods, systems and non-transitory computer readable mediums can also include calculating the required throughput to satisfying transmitting a data amount stored at a regular buffer, receiving, from the eNodeB, uplink grants and transmitting, data from the regular buffer. The methods, systems and non-transitory computer readable mediums can also include calculating estimated throughput from the user equipment, determining if the estimated throughput services the data amount stored at the regular buffer and in response to the estimated throughput being insufficient to service the data amount stored the regular buffer, determining if a counter is less than a threshold value (e.g., 5, configured by a user, etc.). When the counter is less than the threshold value, recording the estimated throughput for the counter, incrementing the counter, reporting a padding amount, and padding a bandwidth estimation buffer with the padding amount.

The methods, systems and non-transitory computer readable mediums can also include modifying the buffer status report by determining an amount of data to be sent from a regular buffer, determining a padding amount from the bandwidth estimation buffer, combining the amount of data to be sent from the regular buffer and the padding amount and modifying the buffer status report with the combined amount.

The methods, systems and non-transitory computer readable mediums can also include in response to the estimated throughput being sufficient to service the data amount stored the regular buffer, determining maximum throughput calculated over one or more packet data networks from the user equipment and determining the padding amount by subtracting the estimated throughput from the maximum throughput.

The methods, systems and non-transitory computer readable mediums can also include when the counter is equal to or greater than the threshold value, calculating an average throughput over one or more estimated throughput values, reporting the average estimated throughput values and emptying the bandwidth estimation buffer. In some examples, the emptying comprises zeroing out the bandwidth estimation buffer.

EXAMPLE EMBODIMENTS

Figure 1:
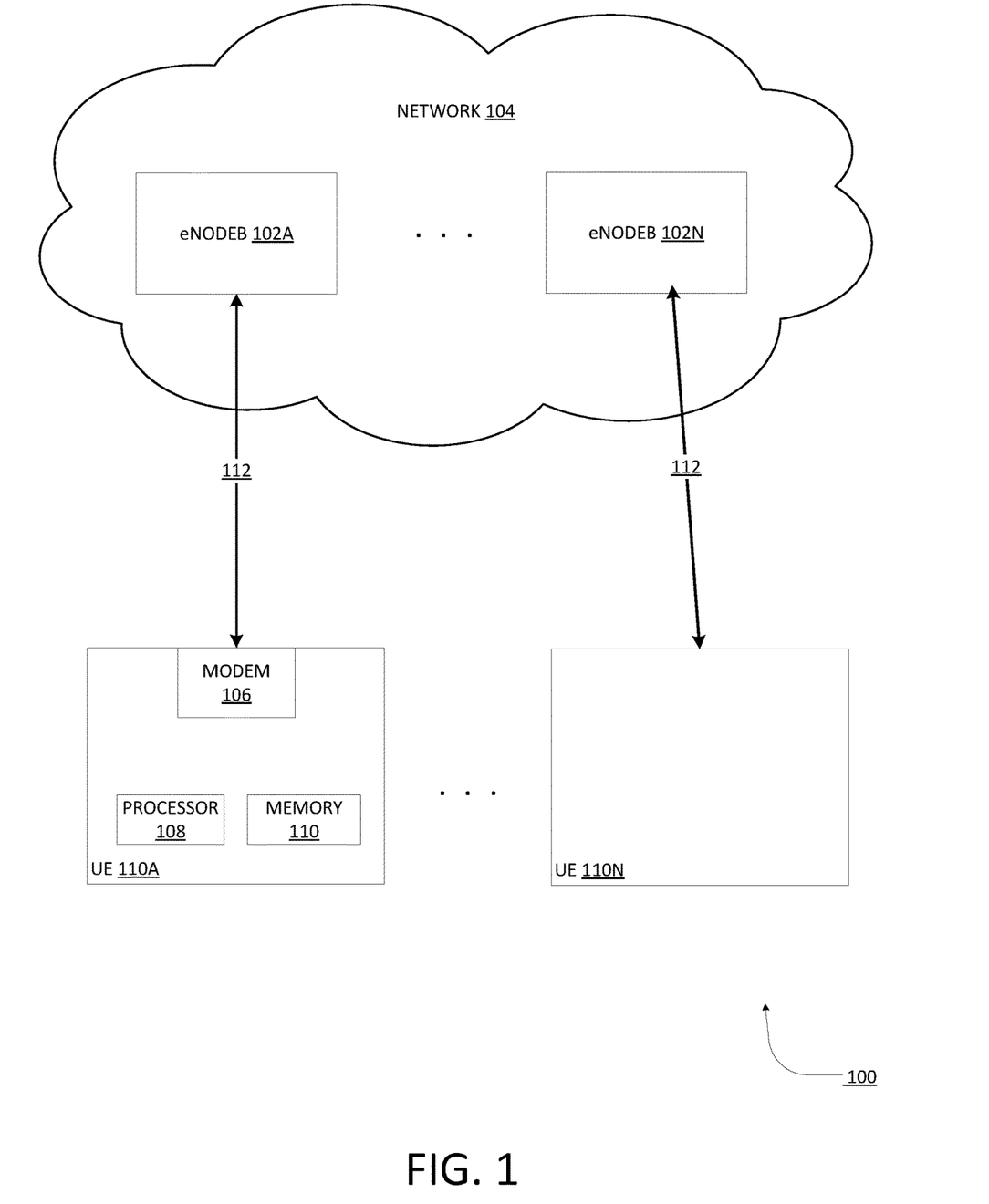
FIG. 1 illustrates an example 5G network environment in which one or more aspects of the present disclosure may operate.
Figure 2:
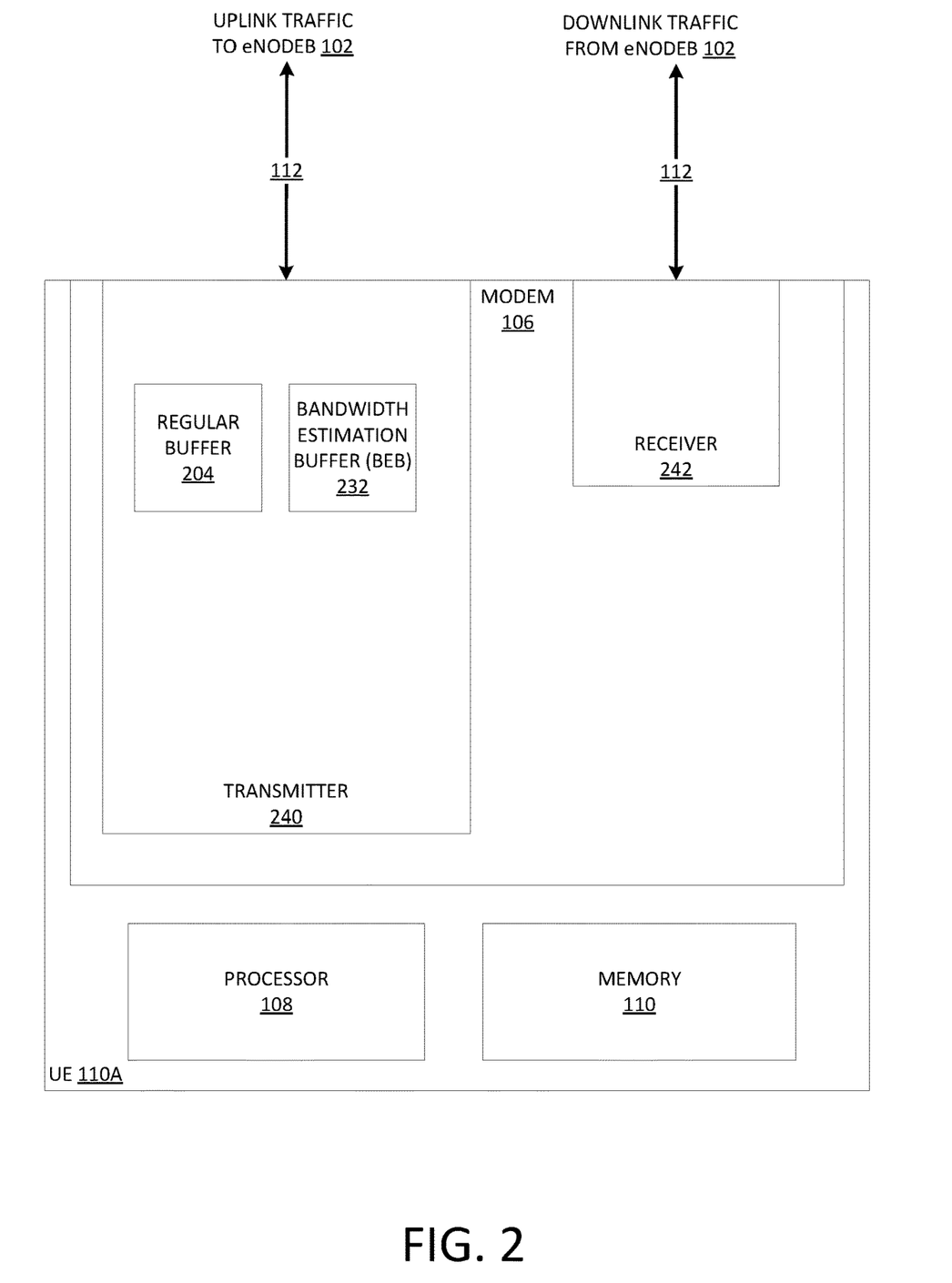
FIG. 2 illustrates an example block diagram of user equipment according to one or more aspects of the present disclosure.
Figure 3:
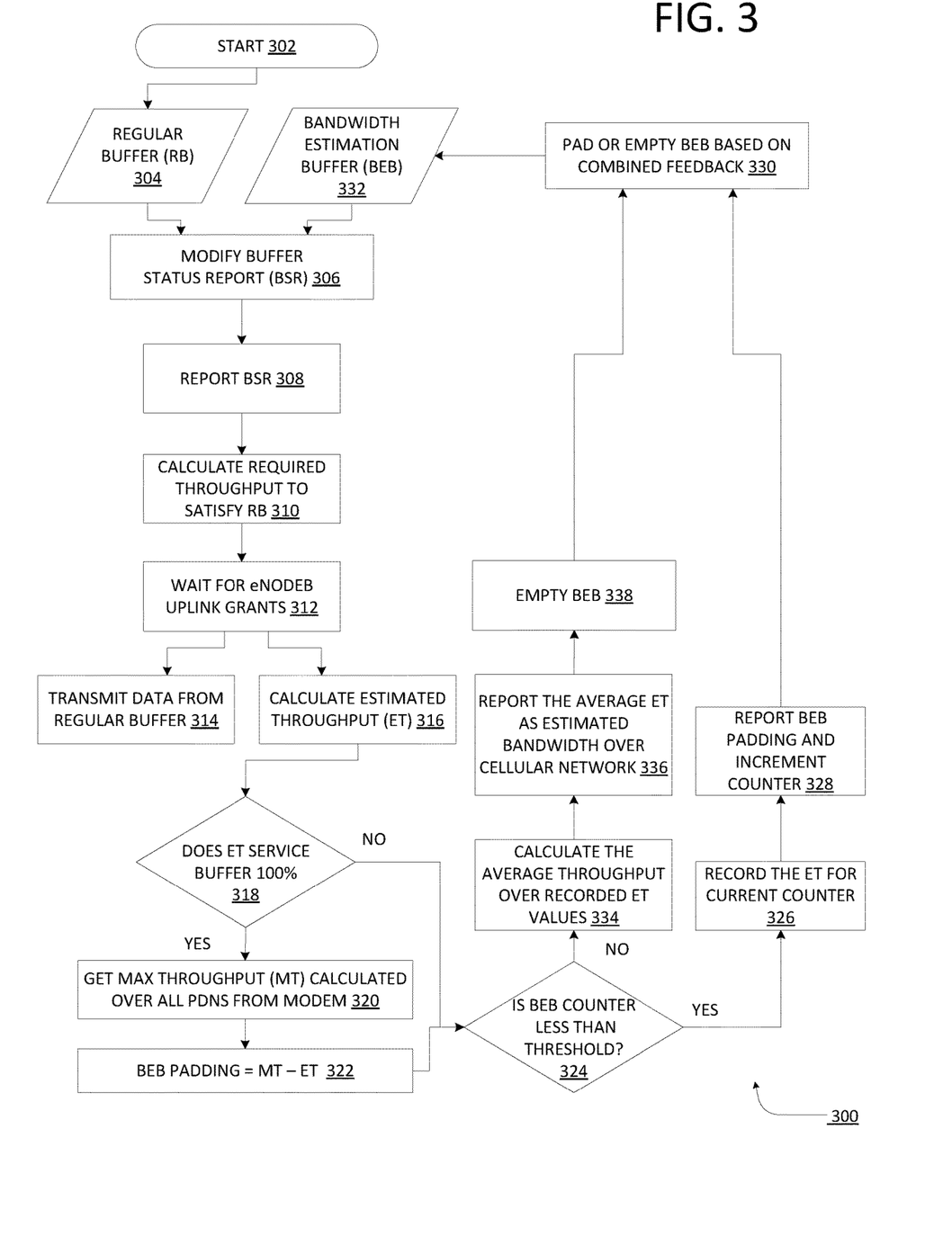
FIG. 3 illustrates an example method for estimating bandwidth according to one or more aspects of the present disclosure.
Figure 4:
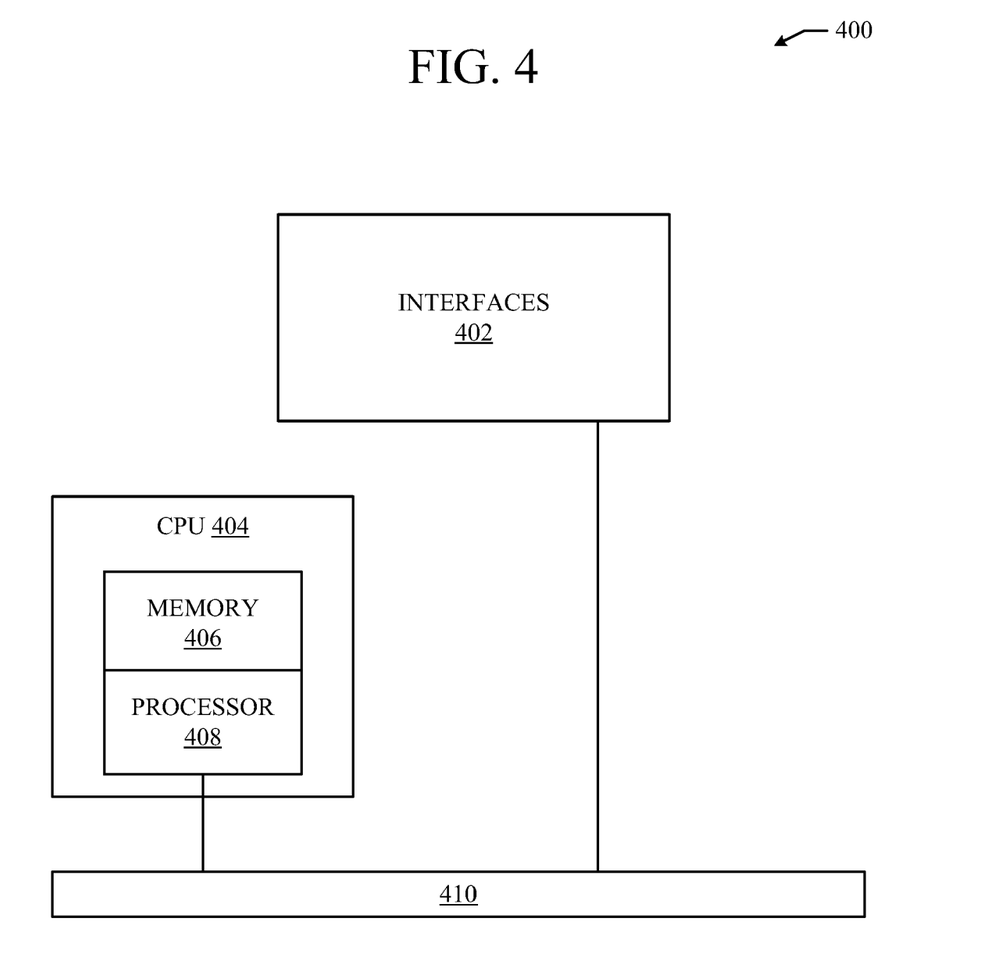
FIG. 4 illustrates an example network device upon which one or more aspects of the present disclosure may be provided.
Figure 5:
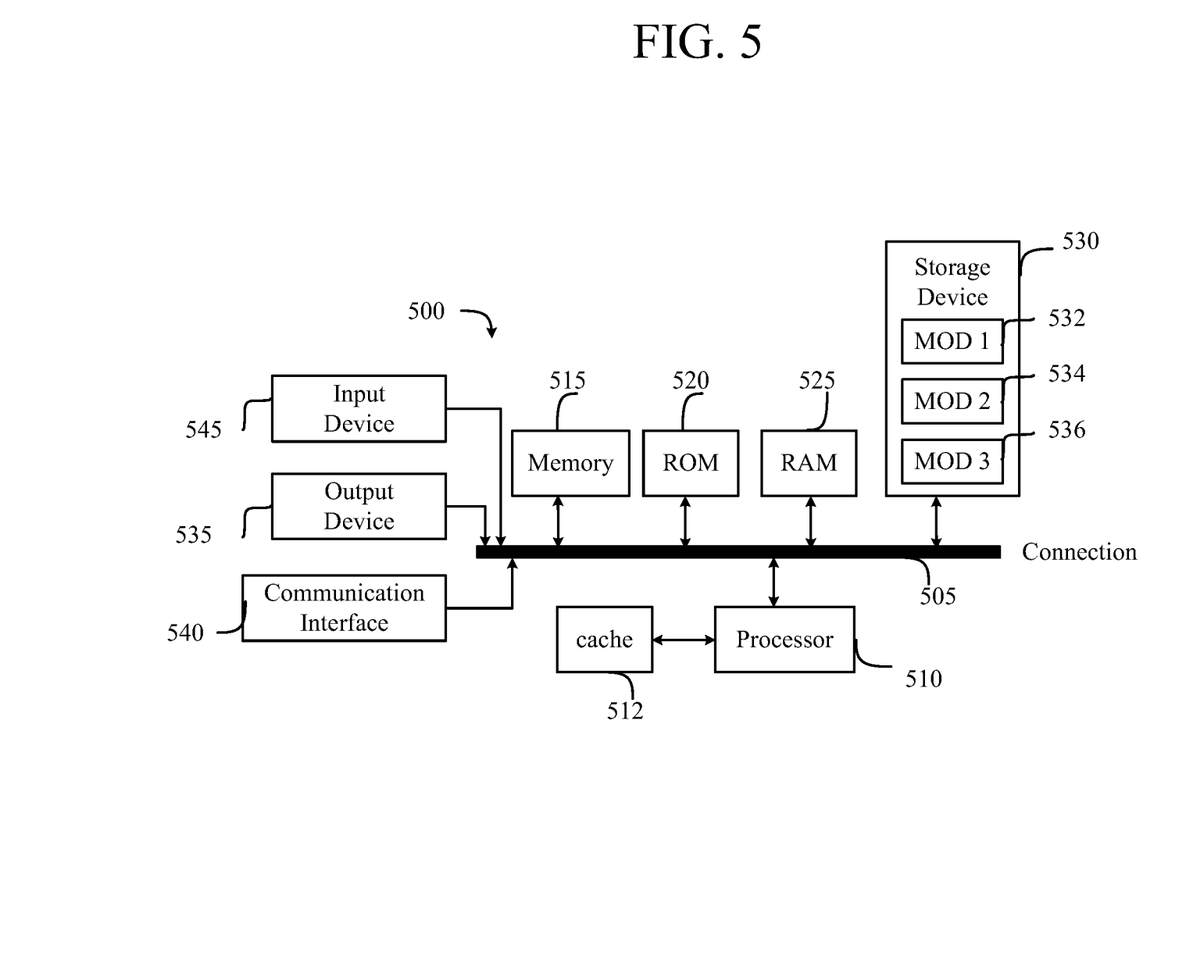
FIG. 5 illustrates an example computing system architecture upon which one or more aspects of the present disclosure may be provided.

The disclosed technology addresses the need in the art for estimating available bandwidth of user equipment in a 5G network. Disclosed are systems, methods, and computer-readable storage media for estimating available bandwidth by manipulating status reports of a regular buffer (RB) by utilizing a bandwidth estimate buffer (BEB) based on maximum and estimated throughput. A description of network computing environments and architectures, as illustrated in FIG. 1, is first disclosed herein. A discussion of user equipment as illustrated in FIG. 2. will then follow. A discussion of estimating the overall bandwidth as illustrated in FIG. 3 will then follow. The discussion then concludes with a description of example devices, as illustrated in FIGS. 4 and 5. These variations shall be described herein as the various embodiments are set forth. The disclosure now turns to FIG. 1.

FIG. 1 depicts an example representation of a network environment 100 in which one or more aspects of the present disclosure may operate. Network 104 can be a broadband cellular network, for example, 5G, 4G, LTE, etc. While not limiting, examples herein will discuss 5G networks. Network 104 can include one or more Evolved Node B (eNodeB) 102A, . . . 102N (collectively "102"). eNodeB 102 can be network hardware connected to network 104 that communicates directly and wirelessly through packet data network 112 (PDN) with user equipment (UE) 110A, . . . 110N (collectively "110"). For example, user equipment can include any component, element or object capable of transferring and receiving voice or data with eNodeB of the network. In some examples, user equipment can be a router, a switch, mobile telephone, etc. Data and/or information, as used herein, refers to any type of numeric, voice, video, media, or script data, or any type of source or object code, or any other suitable information in any appropriate format that may be communicated from one point to another. In some examples, eNodeB 102 can recognize a cellular interface (e.g., modem) of UE 110 initiating communication with network 104. UE 110 can transmit and/or receive data through modem 106 (e.g., I/O interface, cellular interface, etc.). UE 110 can also include processor 108 and memory 110 configured to store and execute instructions for the operation of UE 110 and for transmitting and/or receiving data through modem 106. Further details of UE 100 is shown in FIGS. 4 and 5.

FIG. 2 depicts an example representation of a user equipment 110 in which one or more aspects of the present disclosure may operate. Modem 106 of UE 110 can include transmitter 240 for sending data via PDN 112 to eNodeB 102 and receiver 242 for receiving data via PDN 112 from eNodeB 102. Transmitter 240 can transmit data as much as the uplink grants allocated by eNodeB 102. That is, eNodeB 102 can allocate uplinks grants of a specific amount of throughput that UE 102 can transmit at any given time. Transmitter 240 can also include RB 204 and BEB 232. RB 204 can store data to be transmitted to eNodeB 102. For example, modem 106 transmits, to eNodeB 102, a Buffer Status Report (BSR). The BSR can indicate the amount of data stored in RB 204 that needs to be transmitted to eNodeB 102. eNodeB 102 can then allocated UL grants to enable transmitter 240 to transmit the data stored in RB 204 to the eNodeB 102. In some situations, it is difficult for the UE to estimate how much throughput can be achieved. BEB 232, as shown in FIG. 3, can store padded data (e.g., data that will not be sent to an eNodeB), which can be used to alter the BSR, in order to determine the maximum throughput on any specific eNodeB.

The disclosure now turns to FIG. 3. The method shown in FIG. 3 is provided by way of example, as there are a variety of ways to carry out the method. Additionally, while the example method is illustrated with a particular order of blocks, those of ordinary skill in the art will appreciate that FIG. 3 and the blocks shown therein can be executed in any order that accomplishes the technical advantages of the present disclosure and can include fewer or more blocks than illustrated.

Each block shown in FIG. 3 represents one or more processes, methods or subroutines, carried out in the example method. The blocks shown in FIG. 3 can be implemented in a network environment such as network environment 100 shown in FIGS. 1 and 2. The flow chart illustrated in FIG. 3 will be described in relation to and make reference to at least the elements of network 100 shown in FIGS. 1 and 2.

Method 300 can begin at block 302. At block 302, an estimation of bandwidth can start (e.g., initiated). Upon initiation, and on first run through of method 300, a data amount in regular buffer (RB) 304 is determined. On the first run through of method 300, any data in BEB 332, if present, is considered stale and not used. At block 306, the buffer status report (BSR) is modified. The BSR can indicate how much data is stored in RB 304 that modem 106 has to send to eNodeB 102. On the first run though of method 300, the BSR is not modified. On subsequent run throughs, the BSR can be modified to reflect the amount of data is RB 304 and BEB 332. The BSR can be modified by, for example, one or more application programming interface (API). For example, the API can be utilized to modify the BSR to indicate RB 304 is "full" or "over capacity" (i.e., data waiting to be read into RB 304). By allocating RB 304 as full, eNodeB 102 can provide maximum available uplink grants for transmitting data in RB 304 (e.g., throughput). When the RB 304 is not full, eNodeB 102 can provide uplink grants (e.g., less uplink grants than when RB 304 is full) to send the data stored in RB 304.

At block 308, the BSR can be reported to eNodeB 102. In some examples, the eNodeB can receive a plurality of BSRs from a plurality of UEs. In providing uplink grants to each UE, the eNodeB can consider the received plurality of BSRs. At block 310, the UE can calculate the throughput required to satisfy the data in RB 304. At block 312, the eNodeB can provide, and modem 106 can wait for and receive, one or more uplink grants. At block 314, upon receiving the uplink grants, modem 106 can transmit, and the eNodeB 102 can receive the data stored in RB 304.

At block 316, estimated throughput (ET) can be calculated. ET can be calculated and based on the uplink grants provided from the eNodeB. In some example, the ET can be calculated from modulation scheme and number of physical resource blocks that are assigned (e.g., TS36.213). At block 318, a determination can be made as to whether the ET can service (e.g., sufficient to transmit) the data currently stored (and/or all of the data that could be stored) in RB 304. In situations where BEB padding exists, the determination can include the combination of data in RB 304 and the BEB padding stored in BEB 332. For example, if the UL grants of 50 Mbps are required to service data stored in RB 304, but the calculated ET is 30 Mbps, then the UE knows the most bandwidth the eNodeB can provide at this instance is less than the UE requires. This value is recorded (block 326). In other examples, if UL grants of 30 Mbps are required to service data stored in RB 304, but the calculated ET is 30 Mbps then the modem could request more bandwidth (i.e., since the eNodeB can potentially provide the UE more grants). This can be calculated into the BSR (e.g., BEB padding).

In some examples, when the traffic (e.g., data) being transmitted over the PDN is of high volume, the BEB will always be empty since the UL grants being received at the modem will be equal to or less than the total required by the modem to service the data requests in the RB. As such, averaging the received UL grants (block 334) will provide an estimation of the bandwidth, which can be provides to the UE and other upper layer protocols. When the traffic (e.g., data) being transmitted over the PDN is low, the UL grants will be enough to service 100% of the RB. The BEB can then aid in modifying the reported BSR to a higher value than data stored in the RB. The higher value to the BSR can provide an estimation of the possible throughput achievable over the uplink (e.g., the modem sends the data from the RB over the UL grants).

When the ET cannot service 100% of the RB, method 300 can proceed to block 324. When the ET can service 100% of the RB, method 300 can proceed to block 320.

At block 320, the maximum possible throughput (MT) is determined for the one or more PDNs from modem 106 to the eNodeB. For example, the MT can be determined based on the capabilities of the modem (e.g., type, CAT4, CAT5, etc.). At block 322, BEB padding is calculated by subtracting the ET from the MT.

At block 324, a determination is made as to whether the BEB counter is less than a threshold amount. The threshold amount can be a number of times that method 300 has been iterated. On the initial run of method 300, BEB counter can be 0. On subsequent runs, the BEB counter will increment. When the BEB counter reaches a threshold amount, the BEB can be emptied and the counter reset (as shown in block 338). While not limiting, in some examples, a threshold amount can be 5. In other examples, the threshold amount can be configurable by a user or automatically configured based on historical data, including historical iterations of method 300.

When the BEB counter is less than the threshold, method 300 can proceed to block 326. At block 326, the ET for the current BEB counter is recorded. In one example, the ET value can be in a local memory of the UE, along with the BEB counter value. For example, for BEB counter value 1, the ET could be 74.6 MBps; for BEB counter value 2, the ET could be 90.0 MBps; etc. At block 328, the BEB counter is incremented and the BEB padding is reported. At block 330, the BEB is either padded or emptied. When the BEB counter is less than the threshold, BEB 332 is padded and another iteration of method 300 is initiated.

Upon further iterations, the BEB padding (block 332) and the data in RB 304 can be used in combination to modify the BSR, at block 306, via the API. For example, the combination can be used to modify the BSR to indicate more data is stored in RB 304 than is actually present. This indication, of the combination of data (e.g., actual data and padding) waiting to be sent to an eNodeB, can notify modem 106 of the actual available bandwidth at that specific time (e.g., received UL grants based on the additional padded data and actual data). That is, the actual available bandwidth, at that specific time, can be the uplink grants from the eNodeB—which are based on the combination of the data in RB 304 and BEB padding in BEB 332. Method 300 can continue, as described above until at block 324, the BEB counter is equal to or greater than the threshold amount. When the BEB counter is equal to or greater than the threshold amount, method 300 can proceed to block 334.

At block 334, the average throughput over recorded ET values is calculated. For example, the ET values (e.g., stored at block 326) can be the average estimated bandwidth over the cellular network (e.g. PDN). In one example, the ET values (for each BEB counter value) can be averaged to calculate the average throughput. At block 336, the average throughput over recorded ET values (e.g. average ET) is reported (e.g., to UE 110 for use by the upper layer protocols). At block 338, the BEB is emptied and the BEB counter can be reset to zero. For example, the BEB can be zeroed out. Method 300 can then restart the estimation process. In some examples, the method can proceed at predetermined intervals, timers, user configured, on-demand, etc.

FIG. 4 depicts an example network device upon which one or more aspects of the present disclosure can be implemented. Although the system shown in FIG. 4 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing, switching, and/or other operations. The ASIC can communicate with other components in the network device 400 via the connection 410, to exchange data and signals and coordinate various types of operations by the network device 400, such as routing, switching, and/or data storage operations, for example.

FIG. 5 illustrates an example computing system architecture 500 including components in electrical communication with each other using a connection 505, such as a bus, upon which one or more aspects of the present disclosure can be implemented. System 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
   at least one processor; and
   at least one memory storing instructions, which when executed by the at least one processor, cause the at least one processor to perform operations comprising:
   determine a data amount in a first buffer;
   calculate an estimated throughput needed to satisfy the data amount in the first buffer;
   determine whether the estimated throughput is sufficient to service the data stored at the first buffer;
   determine, in response to the throughput being determined to be insufficient to service the data, whether a counter value for a counter is less than a threshold value;
   empty, in response to the counter value being above the threshold, a second buffer;
   in response to the counter value being less than the threshold value:
   pad the second buffer with a padding amount;
   incrementing the counter value; and
   iteratively repeating the operations by returning to the calculating with the incremented counter value.

2. The system of claim 1, wherein the instructions, when executed by the at least one processor, further cause the at least one processor to:
   when the counter value is less than the threshold value, report the padding amount and increment the counter.

3. The system of claim 1, wherein the at least one memory comprising further instructions, which when executed by the at least one processor, causes the at least one processor to:
   when the throughput is sufficient to service the data stored in the first buffer, determine maximum throughput calculated over one or more packet data networks from user equipment, and determine the padding amount by subtracting the throughput from the maximum throughput.

4. The system of claim 1, wherein the at least one memory comprising further instructions, which when executed by the at least one processor, causes the at least one processor to:
   when the counter is equal to or greater than the threshold value, calculate an average throughput over one or more estimated throughput values, report the average throughput, empty the second buffer, and reset the second buffer.

5. The system of claim 1, wherein the at least one memory comprising further instructions, which when executed by the at least one processor, causes the at least one processor to:
   empty the second buffer and zero out the second buffer.

6. The system of claim 1, wherein the threshold value is 5.

7. A method comprising:
   determining a data amount in a first buffer;
   calculating an estimated throughput needed to satisfy the data amount in the first buffer;
   determining whether the estimated throughput is sufficient to service the data stored at the first buffer;
   determining, in response to the throughput being determined to be insufficient to service the data, whether a counter value for a counter is less than a threshold value;
   emptying, in response to the counter value being above the threshold, a second buffer;
   in response to the counter value being less than the threshold value:
   padding the second buffer with a padding amount;
   incrementing the counter value; and
   iteratively repeating the method by returning to the calculating with the incremented counter value.

8. The method of claim 7, further comprising:
   when the counter value is less than the threshold value, reporting the padding amount and incrementing the counter.

9. The method of claim 7, further comprising:
   when the throughput is sufficient to service the data, determining maximum throughput calculated over one or more packet data networks from user equipment, and determining the padding amount by subtracting the throughput from the maximum throughput.

10. The method of claim 7, further comprising:
    when the counter is equal to or greater than the threshold value, calculating an average throughput over one or more estimated throughput values, reporting the average throughput, emptying the second buffer, and resetting the second buffer.

11. The method of claim 10, further comprising:
    emptying the second buffer and zeroing out the second buffer.

12. The method of claim 7, wherein the threshold value is 5.

13. A non-transitory computer readable medium, for estimating throughput from user equipment to an eNodeB, storing instructions which when executed by at least one processor, cause the at least one processor to perform operations comprising:
    determine a data amount in a first buffer;
    calculate an estimated throughput needed to satisfy the data amount in the first buffer;
    determine whether the estimated throughput is sufficient to service the data stored at the first buffer;
    determine, in response to the throughput being determined to be insufficient to service the data, whether a counter value for a counter is less than a threshold value;
    empty, in response to the counter value being above the threshold, a second buffer;
    in response to the counter value being less than the threshold value:
    pad the second buffer with a padding amount;
    incrementing the counter value; and
    iteratively repeating the method by returning to the calculating with the incremented counter value.

14. The non-transitory computer readable medium of claim 13, wherein the instructions, when executed by the at least one processor, further cause the at least one processor to:

when the counter value is less than the threshold value, report the padding amount and increment the counter.

15. The non-transitory computer readable medium of claim 13, wherein the instructions, when executed by the at least one processor, further cause the at least one processor to:

when the throughput is sufficient to service the data, determine maximum throughput calculated over one or more packet data networks from the user equipment, and determine the padding amount by subtracting the throughput from the maximum throughput.

16. The non-transitory computer readable medium of claim 13, wherein the instructions, when executed by the at least one processor, further cause the at least one processor to:

when the counter is equal to or greater than the threshold value, calculate an average throughput over one or more estimated throughput values, report the average throughput, empty the second buffer, and reset the second buffer.

17. The non-transitory computer readable medium of claim 16, wherein the instructions, when executed by the at least one processor, further cause the at least one processor to:

empty the second buffer includes zero out the second buffer.

* * * * *